Aug. 9, 1938.　　　　G. H. HUFFERD　　　　2,126,389
BALL JOINT
Filed Oct. 19, 1936
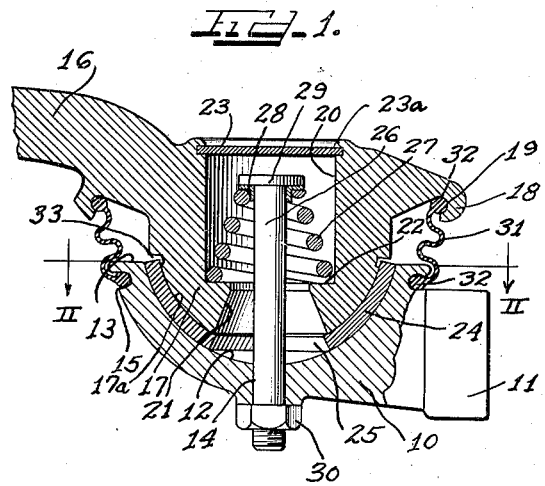
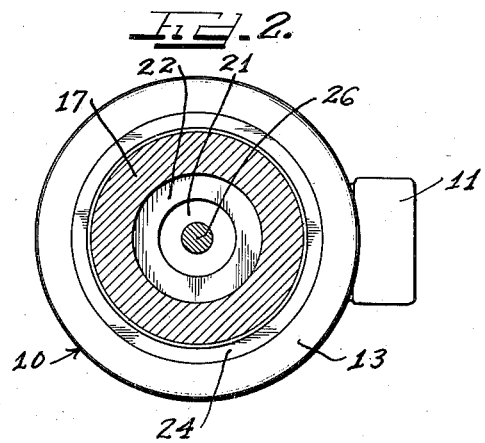
Inventor
GEORGE H. HUFFERD.
by Charles O. Wills Attys.

Patented Aug. 9, 1938

2,126,389

UNITED STATES PATENT OFFICE 2,126,389

BALL JOINT

George H. Hufferd, Detroit, Mich., assignor to Thompson Products, Incorporated, Cleveland, Ohio, a corporation of Ohio Application October 19, 1936, Serial No. 106,342

3 Claims. (Cl. 287—90)

This invention relates to joints permitting limited universal movement between parts connected thereto and more specifically relates to ball joints adapted for use on front wheel suspensions of automotive vehicles.

It is known that independently suspended front wheels of automotive vehicles require joint connections between the wheel supporting assembly and the suspending mechanism. These joints are constantly moving during operation of the automobile and should be well lubricated to prevent binding.

It is then an object of this invention to provide simple ball joints for front wheel suspensions, which joints have large storage capacity for lubricant and can be operated almost indefinitely without lubrication.

A further object of this invention is to provide a simple ball joint construction that is readily disassembled.

A further object of this invention is to provide a ball joint construction capable of supporting heavy compression loads without interfering with the operation of the joint.

Another object of this invention is to provide a readily disassembled ball joint construction having a large lubricant storage capacity.

Other and further objects of this invention will become apparent to those skilled in the art from the following detailed description of the annexed sheet of drawing which discloses a preferred embodiment of the invention.

On the drawing:

Figure 1 is a vertical cross sectional view, with parts shown in elevation, of a ball joint according to this invention.

Figure 2 is a horizontal cross sectional view, with parts shown in elevation, taken substantially along the line II—II of Figure 1.

As shown on the drawing:

In Figures 1 and 2, the reference numeral 10 designates a bowl-shaped housing or socket for the joint having a laterally extending boss portion 11 for attachment to the wheel supporting structure of an independently suspended front wheel (not shown). The portion 11 can be internally threaded to receive a stub bolt from the wheel supporting structure (not shown).

The housing 10 has a segmental spherical inner wall 12, a flat top portion 13, and a bore 14 through the central part of the base thereof. The segmental spherical inner wall 12 of the housing 10 is preferably hemi-spherical.

A peripheral groove 15 is formed in the outside of the housing 10 beneath the flat top 13 thereof.

An arm 16 from a wheel suspending mechanism (not shown) is formed with a segmental ball end 17 on the underside thereof and an overhanging flange portion 18 defining an inner peripheral groove 19 above the ball end.

The central portion of the ball end 17 of the arm 16 is cut away to provide a well or chamber 20 extending below the top face 13 of the housing 10. The bottom of the well 20 communicates with the small end of a frusto-conical bore 21 extending from the bottom of the well through the ball end. A shoulder 22 is thus formed at the bottom of the well. The top of the well 20 can be readily closed and sealed by a plate 23 spun into the ball end of the arm as at 23ª.

A segmental spherical seating element 24 is interposed between the segmental spherical surface 17ª of the ball end 17 and the segmental spherical wall of the housing 10. The seating element 24 has a frusto-conical bore 25 extending through the bottom portion thereof to register with the frusto-conical bore 21 of the ball end 17.

A bolt 26 extends from the well 20 through the frusto-conical bores 21 and 25 of the ball end 17 and seating element 24 and through the bore 14 of the housing 10. A coiled spring 27 is disposed around the bolt 26 in the well 20 with the large end thereof abutting the shoulder 22 at the base of the well and the small end thereof disposed around a flanged collar 28 loosely mounted around the shank of the bolt 26 beneath the head 29 thereof.

A nut 30 is threaded onto the base of the bolt outside of the housing 10 and can be adjusted to effect a desired compression of the coiled spring 27.

A flexible annular closure member 31 is disposed around the top of the housing 10 and is preferably provided with beads 32 at the ends thereof for insertion into the peripheral groove 15 of the housing and the peripheral groove 19 of the flanged member 18 on the ball end 17 respectively.

The well 20 and the frusto-conical bore 21 of the ball end 17, as well as the space beneath the frusto-conical portion can be packed with grease or other lubricant, and it is thus evident that the joint has a large storage capacity for lubricants. The closure member 31 prevents ingress of dirt and leakage of lubricant from the joint.

In operation, relative tilting movement in all directions between the housing 10 and the arm 16 is permitted by movement of the seating element 24 on the segmental spherical wall 12 of the housing 10. The seating element 24 is prevented from being displaced during tilting movements of the stud by a shoulder 33 formed around the top portion of the ball end 17. Relative rotating movements between the housing 10 and the arm 16 are accommodated by the segmental spherical surface 17ᵃ of the ball end 17, and the inner segmental spherical surface of the seating element 24. Relative rotation between the housing and the arm is not interfered with by the spring member, since the flanged collar 28 is freely rotatable around the bolt 26.

Any desired resistance to tilting and rotating movement can be obtained by varying the compression of the spring 27. While the joint is primarily operated under compression loads, it is evident that a tension load tending to separate the ball from the housing will be resisted by the spring.

The joint is readily disassembled by merely removing the nut 30 from the bolt 26, and any desired amount of relative tilting movement between the ball and the socket can be obtained by regulating the size of the frusto-conical bores 21 and 25.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a bowl-shaped housing having a bore through the bottom thereof, an arm member having a segmental ball portion on the underside thereof and an overhanging annular flanged portion above the ball portion, said flanged portion defining a groove thereunder, said housing having an outer peripheral groove formed therearound near the top thereof, a flexible annular closure member seated in the grooves of flange portion and housing respectively, a seating element disposed between the ball portion of the arm and the inner wall of the housing in bearing relation therewith, said arm having a shoulder formed therearound above the ball portion for abutting the seating element to prevent displacement thereof during tilting movements of the joint, said arm member having a bore extending therethrough, said seating element having a central opening in alignment with said bore, a bolt slidably extending through the bores of the arm and housing respectively and through the central opening of the seating element, a nut threaded on said bolt outside of said housing, a coiled spring disposed around said bolt and adapted to be compressed by adjusting the nut on the bolt to slide the bolt relative to the housing, and a closure means for the bore in the arm member whereby lubricants can be stored therein to lubricate the bearing surfaces of the joint.

2. A joint comprising a bowl-shaped housing having a segmental spherical inner wall with a bore through the bottom thereof, a seating member having inner and outer segmental spherical bearing surfaces in said housing with the outer surface in bearing relation with the inner wall of the housing, said seating member having an open central portion, a member having a segmental ball portion thereon seated in the seating member, said ball portion having an annular shoulder for abutting the edge of the seating member, said ball portion also having a well formed therein extending into spaced relation from the bottom thereof, a tapered bore extending from the bottom of the well through the ball portion, the small end of said tapered bore communicating with the bottom of the well in spaced relation from the side walls of the well and the large end of said tapered bore communicating with the opening in said seating member, a headed bolt extending from said well through the tapered bore, the opening in the seating member, and the bore in the housing, a flanged collar freely rotatable under the head of said bolt in said well, a tapered coiled spring seated at one end against said collar and at the other end on the base of the well, a nut threaded around the end of the bolt extending through the housing for adjusting the compression of the spring, a closure plate for said well whereby lubricant can be packed therein to lubricate the bearing surfaces of the joint, and an annular flexible seal disposed between the housing and the ball member to prevent leakage of lubricant and ingress of dirt to the joint.

3. A joint adapted to carry heavy compression loads without binding which comprises an open topped housing having a hemi-spherical depression therein, a segmental ball member in said housing, said member having a shoulder therearound above the housing but adapted to fit into the housing, a seat member interposed between the housing and ball member beneath the shoulder of the ball member having bearing surfaces on both sides thereof in bearing relation with the ball end and housing, said shoulder of the ball member adapted to abut the seat member to carry the seat member therewith during tilting movements thereof, said segmental ball member having a well therein with a shoulder at the bottom of the well and a bore extending from the bottom of the well through the ball member, seat member, and housing, a headed bolt slidably extending from said well through the bore and having a threaded end projecting below the housing, a coiled spring disposed around said bolt in said well seated at opposite ends thereof under the bolt head and on the shoulder at the bottom of the well and a nut on the projecting end of the bolt for sliding the bolt relative to the housing to regulate compression of the spring.

GEORGE H. HUFFERD.